United States Patent [19]

Muller et al.

[11] Patent Number: 4,719,641
[45] Date of Patent: Jan. 12, 1988

[54] MULTIPLE CHAMBER LASER CONTAINMENT SYSTEM

[75] Inventors: David F. Muller, Boston; Peter B. Scott, Bedford, both of Mass.

[73] Assignee: Summit Technology, Inc., Watertown, Mass.

[21] Appl. No.: 796,550

[22] Filed: Nov. 8, 1985

[51] Int. Cl.[4] ............................................. H01S 3/00
[52] U.S. Cl. ..................................... 372/109; 372/55
[58] Field of Search ................. 372/57, 55, 109, 38, 372/86, 58, 59; 128/303.1

[56] References Cited

U.S. PATENT DOCUMENTS

| | | | |
|---|---|---|---|
| 3,449,694 | 6/1969 | Bell | 331/94.5 |
| 3,477,038 | 11/1969 | Shimazu | 331/94.5 |
| 3,702,973 | 11/1972 | Daugherty et al. | 331/94.5 |
| 3,721,915 | 3/1973 | Reilly | 331/94.5 |
| 3,842,366 | 10/1974 | Gordon et al. | 331/94.5 |
| 3,883,818 | 5/1975 | Hersing et al. | 331/94.5 |
| 4,283,686 | 8/1981 | Daugherty | 331/94.5 |
| 4,301,425 | 11/1981 | Sze | 331/94.5 |
| 4,313,093 | 1/1982 | Suenaga et al. | 372/56 |
| 4,317,087 | 2/1982 | Sander et al. | 372/57 |
| 4,318,056 | 3/1982 | Sze | 372/57 |
| 4,334,199 | 6/1982 | Ham | 372/57 |
| 4,340,968 | 7/1982 | Willis et al. | 372/60 |
| 4,348,647 | 9/1982 | Nigham et al. | 372/74 |
| 4,393,505 | 7/1983 | Fahlen | 372/57 |
| 4,417,342 | 11/1983 | McKee | 372/87 |
| 4,426,706 | 1/1984 | Liu et al. | 372/86 |
| 4,618,960 | 10/1986 | Nazemi | 372/87 |
| 8,606,642 | 11/1986 | Clarke et al. | 128/303.1 |

OTHER PUBLICATIONS

"Atmospheric-Pressure Pulsed $CO_2$ Laser Utilizing Preionization by High-Energy Electrons", Garnsworthy et al., Applied Physics Letters, vol. 19 #12, Dec. 1971.

Primary Examiner—James W. Davie
Assistant Examiner—Bertha Randolph
Attorney, Agent, or Firm—Thomas J. Engellenner

[57] ABSTRACT

A laser system is disclosed in which the laser medium is operated at high pressures, for example, at pressures of about 3 atmospheres or above, to yield high performance. High pressure operation is achieved by employing a two or more stage containment system. In one preferred embodiment, a first containment system, housing high voltage components, can be pressurized to about 2 atmospheres or more with a high dielectric constant gas to permit low inductance circuitry. The laser head assembly is encased within a second containment vessel and further pressurized to about 3 atmospheres or more. The laser head assembly can also include a flow nozzle and ventilated electrodes to reduce stagnant pockets and eddy currents in the circulating laser medium.

12 Claims, 4 Drawing Figures

MULTIPLE CHAMBER LASER CONTAINMENT SYSTEM

BACKGROUND OF THE INVENTION

The technical field of the invention pertains generally to lasers and more particularly to pressurized excimer laser devices and the like.

Excimer or "excited dimer" lasers are pulsed gas lasers which typically employ mixtures of halogens and rare gases, together with buffer gases and other additives to create an active medium. When pumped to an electronically excited state, the rare gas and halogen ions form dimer molecules. These molecules emit high intensity, short wavelength radiation when they relax and return to the dissociated ground state.

A number of factors, however, typically limit the efficiency of presently available electric discharge excimer lasers. Although pressurizing the laser medium can increase energy extraction, conventional laser head designs are typically unable to operate above two atmospheres of pressure. Moreover, the ability of gas lasers to operate at high pulse repetition rates is dependent upon the clearing of the laser medium between pulses. Stagnant pockets and eddy currents in the gas flow lead to localized heating, arcing and premature degradation of the medium.

There exists a need for better lasers, particularly excimer lasers and the like. There exists a need for better laser system designs that allow high pressure operation and substantially reduce stagnant pockets of gas, thereby increasing energy extraction at high repetition rates. Moreover, laser systems that would enhance efficiency and compactness or increase safety as well as improve energy extraction would satisfy long-felt needs in the industry.

SUMMARY OF THE INVENTION

A high energy, compact and efficient excimer laser is disclosed. In one aspect of the invention, the laser medium is operated at high pressures, for example, at pressures of about 3 atmospheres or above, to yield higher performances. High pressure operation is achieved by employing a two or more stage containment system. Since the limiting factor in laser vessel pressurization typically is the pressure differential—about 2 atmospheres—which can be tolerated at the laser windows, the use of a multi-stage system assures that the window pressure limit is not exceeded. Multiple stage containment also provides an added measure of safety, making the laser system particularly useful for laser surgery or other therapy in hospitals and clinical environments where humans might otherwise be exposed to potentially hazardous gas leaks. Moreover, the two stage pressurization system of the present invention permits differential pressure adjustment of the laser medium.

In one preferred embodiment, the high voltage supply, thyratron, magnetic switch and pulse-shaping capacitors are encased by a first containment stage and pressurized to about two or more times the normal atmosphere pressure. The laser vessel, itself, with the rare gas and halide mixture, can then be pressurized to higher pressure within a second containment system.

In another aspect of the invention, the first containment system, housing the high voltage components, can be pressurized with a high dielectric constant gas to permit low inductance circuitry. Preferably, the high dielectric constant gas has a first ionization potential of about 10 electron-volts or higher. Such high dielectric constant gases include, without limitation, helium, neon, argon, xenon, krypton, sulfur hexafluoride, nitrogen and mixtures thereof. The use of such gases can elminate ozone production due to corona effects and allows closer packing of the high voltage components. These factors together permit higher operational voltages (i.e., up to 40 kV or more) and, thereby, increase volumetric energy extraction.

The gas medium for the laser vessel or head is preferably pressurized to a higher pressure, for example, about three or more times normal atmospheric pressure, to further increase volumetric energy extraction. The gas media useful for lasers according to the present invention include, without limitation, Argon-Fluoride mixtures, Argon-Helium mixtures, Xenon-Fluoride mixtures, Xenon-Chloride mixtures, Xenon-Bromide mixtures, Krypton-Fluoride mixtures and Krypton-Chloride mixtures. Excimer gas mixtures useful in the present invention can also include various buffers, such as helium or argon buffers, and various additives, for enhanced performance.

It is also preferred that a flow nozzle be incorporated into the laser head design to insure rapid clearing of the gas medium and the elimination of stagnant pockets where heating and then arcing can occur. The flow nozzle design allows the laser to operate at high pulse repetition rates, directing the gas across and between any preionization elements to cool them and thereby avoid heat damage.

Additionally, a "ventilated" discharge electrode design is disclosed to eliminate stagnant gas pockets in critical areas. The ventilated electrode cooperates with the flow nozzle to clear the laser medium from the discharge region between pulses.

The invention will next be described in connection with certain preferred embodiments; however, it should be clear that various changes and modifications can be made without departing from the spirit or scope of the invention. For example, various alternative excitation systems can be employed. Moreover, although the invention is described in connection with various excimer laser media, other gas mixtures that lase in response to electrical excitation can apply the teachings of the present invention; such gaseous media include, without limitation, chemical lasers, halogen and rare gas ion lasers, nitrogen lasers and carbon dioxide lasers.

DETAILED DESCRIPTION

Figure 1:
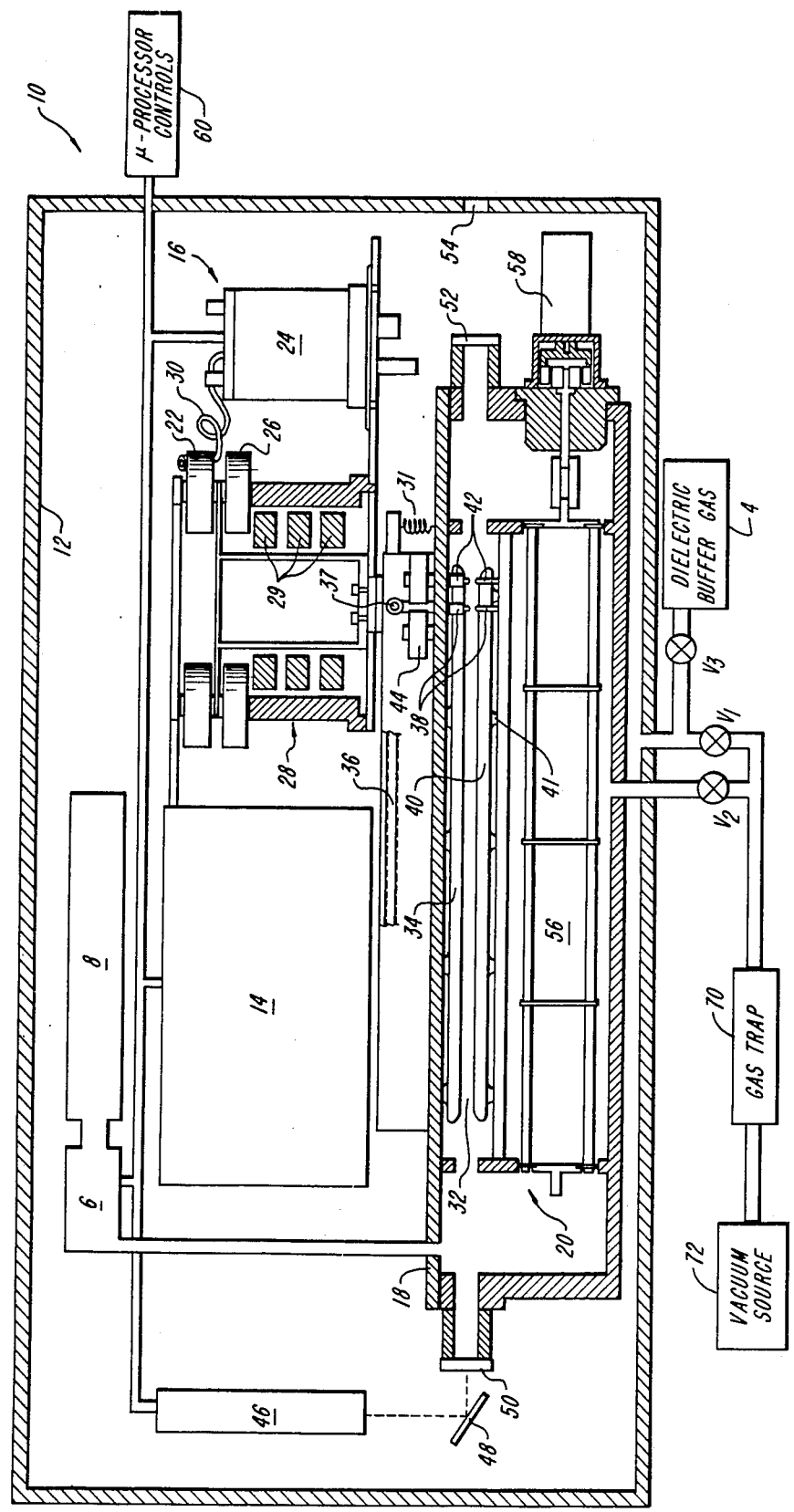
FIG. 1 is an overall schematic diagram of a laser system according to the invention.

In FIG. 1 a detailed illustration of a laser system 10 is shown, consisting of a primary containment vessel 12, encasing a high voltage supply 14, a pulse-forming network 16 and a secondary containment vessel 18 (with a laser head assembly 20 therein). The primary containment vessel 12 is preferably filled with a high dielectric constant gas 4, such as a nitrogen (80 percent) and sulfur hexafluoride (20 percent mixture, via value V3 and pressurized to about to 2-4 atmospheres. The secondary containment vessel contains the laser medium, for example, an argon fluoride mixture, and can be further pressurized to about 3–6 atmospheres. The gas tank 8 containing the laser gas is preferably housed within the primary containment vessel 12 for added safety and the gas is metered into the secondary containment vessel 18 via regulator 6. Valves V1 and V2 are coupled to a gas (scrubber) trap 70 and a vacuum 72 source to permit the safe evacuation of the vessels 12 and 18.

Additionally, as shown in FIG. 1 the pulse forming network of the present invention includes primary main storage capacitors 22, a thyratron switch 24, secondary main storage capacitors 26 and a saturable magnetic switch 28. In operation, the high voltage source delivers D.C. high voltage of about 1 kilojoule per second at 40 V which charge capacitors 22. In one embodiment the primary storage capacitors can be formed by eight parallel-connected capacitors of about 2.5 nano-farads each. After the capacitors 22 are charged, the thyratron switch (typically rated at 35 kV at 3–5 kA) is triggered to discharge the capacitors into a second set of storage capacitors 26 (similarly a set of eight, 2.5 nano-farad capacitors) which fed the saturable magnetic switch 28.

Figure 2:
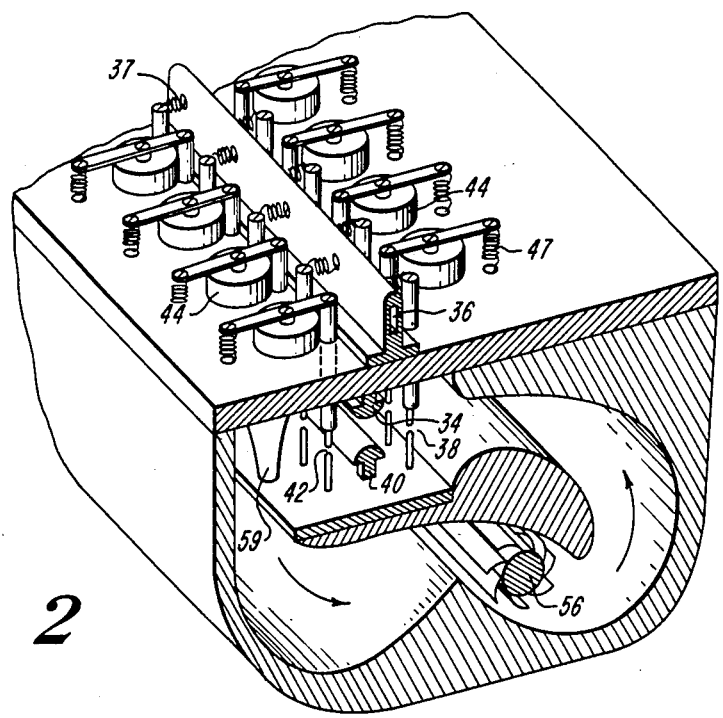
FIG. 2 is more detailed partial cross-sectional, isometric representation of a laser head for use in a laser system of FIG. 1.

The saturable switch 28 can be formed, for example, by a coaxial transmission line having a plurality of metal-impregnated core elements 29. The saturable switch 28 impedes the current flow until it saturates and then acts as a short circuit. The cummulative effect of the pulse forming network is to compress the initial high voltage pulse of about 600 nano-seconds into a pulse of about 60 nano-seconds. Also shown in FIG. 2 is a coil 30 of about 10 millihenry coupling the thyratron switch 24 to the high voltage source 14 in order to smooth the initial current pluse through the switch 24 and thereby prolong its useful lifetime. By varying the number of turns in coil 30, the voltage-time product associated with the charge transfer from the primary main storage capacitors 22 to the secondary capacitors 26 can be controlled. An initializing inductor 31 can also be employed to ground the common sides of capacitor 22 and 26, respectively, thereby providing a charging path and draining the secondary capacitors 26 between pulses.

The laser head assembly 20 is shown in FIGS. 1–4 as consisting of a laser medium 32, a grounded electrode 34, a plurality of decoupling inductors 37, a charge transfer bus 36, a first spark array 38, a floating electrode 40, a second spark array 42 and a series of sustainer capacitors 44. For simplicity only a few of the excitation elements as shown in FIG. 1.

The secondary containment vessel 18 also includes mirrors 50, 52 which define the resonant cavity of the laser. Mirror 52 is partially transmissive and thereby allows extraction of the laser beam through output port 54. The mirrors 50, 52 can be formed, for example, by reflective coatings on calcium fluoride windows. Also disposed within the secondary containment vessel 18 is a blower turbine blade 56, operated by blower motor 58 to circulate the medium 32 between electrodes 34 and 40. Additionally, as shown in FIG. 1 an alignment laser 46 together with an adjustable mirror or prime element 48 can be disposed within the primary containment vessel 12. All of the electrical elements, as shown in FIG. 1 are preferably controlled by a microprocessor 60 or the like located outside of the containment vessels.

FIG. 1 also shows another feature of the invention, that being, ventilated electrodes. In order to minimize stagnant pockets and eddy currents, the grounded electrode 34 and the floating electrode 40 can be formed by elongated rail-shaped elements, disposed opposite each other and each presenting a smooth, curved equipotential surface to the other. The rail-shaped elements are supported by a plurality of support posts 41. The spaces between the support posts 41 serve to ventilate the electrodes 34, 40, allowing the laser medium to flow with less obstruction.

Figure 3:
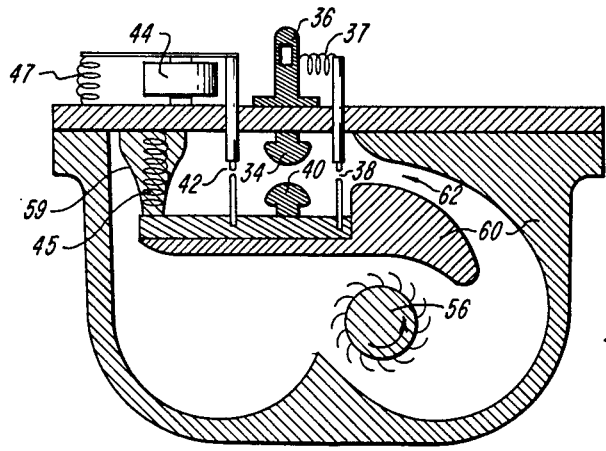
FIG. 3 is an end view of the laser head of FIG. 2.
Figure 4:
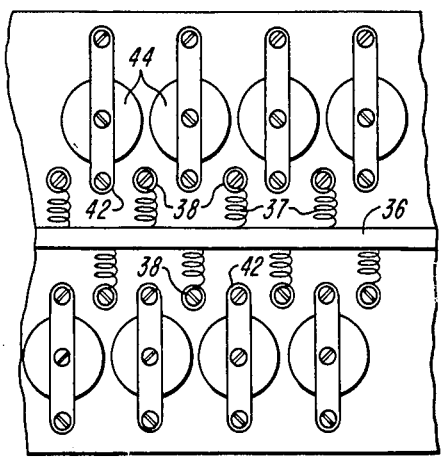
FIG. 4 is a top view of the laser head of FIG. 2.

FIGS. 2, 3 and 4 show the elements of the laser head assembly 20 in more detail. Charge is transferred to the excitation system of the present invention via bus bar 36 which is electrically connected in parallel to a plurality of first spark inducing elements 38 via a plurality of decoupling inductors 37. As described above the high voltage pulse passes through the floating electrode 40 to plurality of second spark inducing elements 42.

FIG. 3 presents a side view of the laser, showing the relationship of the electrodes 34, 40 and two individual spark-inducing elements 38a, 42a from the first and second arrays most clearly. Inductors 45 serve to ground the floating electrode 40 after each pulse while inductors 47 serve to drain the sustainer capacitor 44 between pulses. Also shown in FIG. 3 is a flow channel 60, preferably formed from a high temperature fluorocarbon polymer, such as Kynar, defining a flow nozzle 62.

In FIG. 4, a top view, one preferred arrangement of the first and second spark arrays is shown wherein the position of the sustainer capacitors 44 relative to the bus bar 36 (and hence the first and second spark-inducing elements) is alternated from one side to the other side along the length of the head assembly.

Obviously, many modifications and variations of the present invention are possible in light of the above teachings. Such additions, substitutions and other arrangements are intended to be covered by the appended claims.

What is claimed is:

1. A laser system comprising a first pressurized containment vessel encasing a high voltage source and a pulse-forming network for generating electrical pulses to excite a laser medium, the first vessel being pressurized with a high dielectric gas and including an output port for a laser beam; and a second higher pressurized containment vessel also disposed within the first containment vessel, said second containment vessel being pressurized with a laser medium and further defining a laser head assembly, said laser head assembly includes two mirrors which define the resonant cavity of the laser wherein one of said mirrors is partially transmissive which allows extraction of the laser beam through said output port and said laser head assembly is electrically connected to said pulse-forming network to induce laser excitation of said medium.

2. The system of claim 1 wherein the first vessel is maintained at a pressure greater than 2 atmospheres.

3. The system of claim 2 wherein the first vessel is pressured with a high dielectric gas having an ionization potential of at least about 10 electron-volts.

4. The system of claim 3 wherein the high dielectric gas is chosen from the group of helium, neon, argon, xenon, krypton, sulfur hexafluoride, nitrogen, and mixtures thereof.

5. The system of claim 1 wherein the second vessel is maintained at a pressure greater than 3 atmospheres.

6. The system of claim 1 wherein the laser head assembly includes a laser medium, a resonant cavity and an excitation means for exciting the medium to an active state.

7. The system of claim 6 wherein the excitation means is a means for generating an electric discharge between a first electrode and a second electrode.

8. The system of claim 7 wherein the first electrode and the second electrode of said excitation means within said laser head are elongated rail-shaped electrodes, disposed opposite each other and each presenting a smooth, curved equipotential surface to the other.

9. The system of claim 8 wherein the elongated rail-shaped electrodes are ventilated electrodes.

10. The system of claim 8 wherein the laser head further comprises a blower which circulates the laser medium and a flow nozzle which is disposed within the chamber to direct the flow of the medium transverse to the elongated electrodes.

11. The system of claim 6 wherein the laser medium is an excimer medium.

12. The system of claim 11 wherein the excimer medium is a rare gas-halide mixture.

* * * * *